United States Patent
Gerami et al.

(10) Patent No.: US 12,557,093 B2
(45) Date of Patent: Feb. 17, 2026

(54) CONFIGURED GRANT ENHANCEMENTS IN UNLICENSED BAND

(71) Applicant: Telefonaktiebolaget LM Ericsson (publ), Stockholm (SE)

(72) Inventors: Majid Gerami, Lund (SE); Bikramjit Singh, Raasepori (FI); Reem Karaki, Aachen (DE); Yufei Blankenship, Kildeer, IL (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 560 days.

(21) Appl. No.: 17/926,330

(22) PCT Filed: May 21, 2021

(86) PCT No.: PCT/EP2021/063646
§ 371 (c)(1),
(2) Date: Nov. 18, 2022

(87) PCT Pub. No.: WO2021/234143
PCT Pub. Date: Nov. 25, 2021

(65) Prior Publication Data
US 2023/0199749 A1 Jun. 22, 2023

Related U.S. Application Data

(60) Provisional application No. 63/029,182, filed on May 22, 2020.

(51) Int. Cl.
*H04W 72/1263* (2023.01)
*H04L 1/00* (2006.01)
(Continued)

(52) U.S. Cl.
CPC ....... *H04W 72/1263* (2013.01); *H04L 1/0061* (2013.01); *H04L 1/1812* (2013.01); *H04W 72/21* (2023.01)

(58) Field of Classification Search
CPC .................. H04W 72/1263; H04W 72/21; H04L 1/0061; H04L 1/1812; H04L 1/1614; H04L 1/1671; H04L 1/1896
See application file for complete search history.

(56) References Cited

U.S. PATENT DOCUMENTS

| | | | |
|---|---|---|---|
| 2018/0199359 A1* | 7/2018 | Cao | H04L 5/0012 |
| 2021/0050947 A1* | 2/2021 | Tsai | H04W 72/23 |

(Continued)

OTHER PUBLICATIONS

3GPP TS 38.211 V16.1.0; 3rd Generation Partnership Project; Technical Specification Group Radio Access Network; NR; Physical channels and modulation (Release 16); Mar. 2020, consisting of 130 pages.

(Continued)

*Primary Examiner* — Ayaz R Sheikh
*Assistant Examiner* — David Zhijun Sun
(74) *Attorney, Agent, or Firm* — Weisberg I.P. Law, P.A.

(57) ABSTRACT

A method, system and apparatus are disclosed. In one or more embodiments, a network node is provided. The network node includes processing circuitry configured to: determine adapted configured grant, CG, control information based at least on CG control information, and signal the adapted CG control information for configuring transmission on at least one CG resource.

17 Claims, 7 Drawing Sheets

(51) Int. Cl.
   *H04L 1/1812*   (2023.01)
   *H04W 72/21*   (2023.01)

(56) References Cited

U.S. PATENT DOCUMENTS

2021/0176015 A1* 6/2021 Xu ..................... H04L 1/1883
2023/0199757 A1* 6/2023 Van Phan ......... H04W 72/1268
                                                          370/329

OTHER PUBLICATIONS

3GPP TS 38.214 V16.1.0; 3rd Generation Partnership Project; Technical Specification Group Radio Access Network; NR; Physical layer procedures for data (Release 16); Mar. 2020, consisting of 151 pages.

3GPP TS 38.213 V16.1.0; 3rd Generation Partnership Project; Technical Specification Group Radio Access Network; NR; Physical layer procedures for control (Release 16); Mar. 2020, consisting of 156 pages.

3GPP TS 38.212 V16.1.0; 3rd Generation Partnership Project; Technical Specification Group Radio Access Network; NR; Multiplexing and channel coding (Release 16); Mar. 2020, consisting of 146 pages.

3GPP TS 38.321 V16.0.0; 3rd Generation Partnership Project; Technical Group Radio Access Network; NR; Medium Access Control (MAC) protocol specification (Release 16); Mar. 2020, consisting of 141 pages.

International Search Report and Written Opinion dated Sep. 2, 2021 for International Application No. PCT/EP2021/063646 filed on May 21, 2021, consisting of 14 pages.

3GPP TSG RAN WG1 Meeting #AH1901 R1-1900876; Title: Enhancement to configured grants in NR unlicensed; Source: Qualcomm Incorporated; Agenda Item: 7.2.2.2.4; Document for: Discussion and Decision; Date and Location: Jan. 21-25, 2019, Taipei, Taiwan, consisting of 9 pages.

3GPP TS 38.321 V16.0.0; 3rd Generation Partnership Project; Technical Specification Group Radio Access Network; NR; Medium Access Control (MAC) protocol specification (Release 16), Mar. 2020, consisting of 141 pages.

* cited by examiner

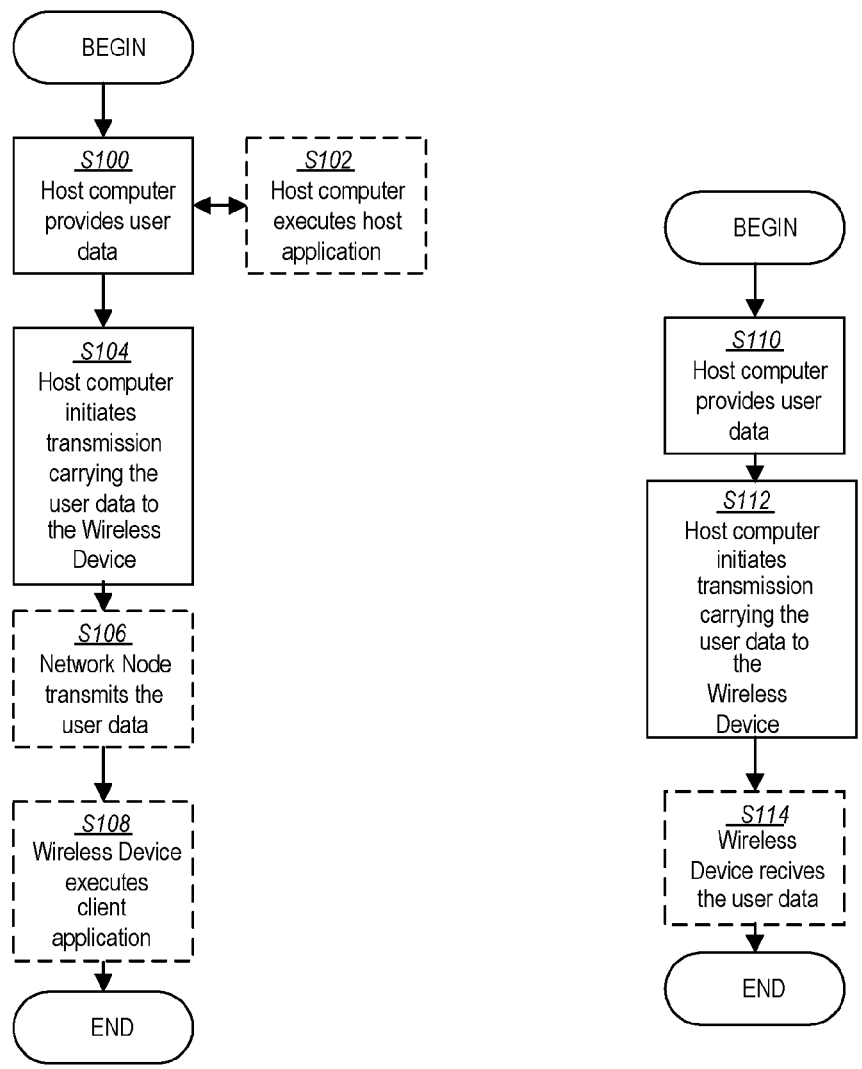

CONFIGURED GRANT ENHANCEMENTS IN UNLICENSED BAND

CROSS-REFERENCE TO RELATED APPLICATIONS

This application is a Submission Under 35 U.S.C. § 371 for U.S. National Stage Patent Application of International Application No.: PCT/EP2021/063646, filed May 21, 2021 entitled "CONFIGURED GRANT ENHANCEMENTS IN UNLICENSED BAND," which claims priority to U.S. Provisional Application No. 63/029,182, filed May 22, 2020, entitled "CONFIGURED GRANT ENHANCEMENTS IN UNLICENSED BAND," the entireties of both of which are incorporated herein by reference.

TECHNICAL FIELD

The present disclosure relates to wireless communications, and in particular, to a configurable configured grant (CG) such as a configurable CG-uplink control information (UCI) and/or configurable CG-downlink feedback information (DFI).

BACKGROUND

Configured Grant in New Radio-Unlicensed (NR-U)

As with the $3^{rd}$ Generation Partnership Project (3GPP) New Radio (NR) (also referred to as $5^{th}$ Generation (5G)) standards, a wireless device in NR-Unlicensed (NR-U) can be semi-statically scheduled for uplink transmission based on Type 1 or Type 2 configured grant. There have been specific enhancements in the configured grant related to time-domain resource allocation, configured grant-uplink control information (CG-UCI), and autonomous uplink (AUL) transmission.

CG Re-Transmission Timer

In NR-U, a timer has been introduced named CG re-transmission timer (CGRT). The CGRT timer can be used for autonomous uplink transmission (AUL). There is also another timer configuredGrantTimer (CGT). CGT limits maximum AUL retransmission attempts for a hybrid automatic repeat request (HARQ) process. When the CGT expires, the wireless device may flush the HARQ buffer for this HARQ process and transmit new data associated to it. FIG. 1 is a diagram illustrating example CGRT and CGT intervals.

As described in Third Generational Partnership Project (3GPP) Technical Specification (TS) 38.321, Section 5.8.2, there are three types of transmission without dynamic grants:

- configured grant Type 1 where an uplink grant is provided by RRC, and stored as a configured uplink grant;
- configured grant Type 2 where an uplink grant is provided by physical downlink control channel (PDCCH), and stored or cleared as configured uplink grant based on L1 signalling indicating configured uplink grant activation or deactivation;
- retransmissions on a stored configured uplink grant of Type 1 or Type 2 configured with cg-Retransmission-Timer.

In 3GPP TS 38.321, V16.0.0; for configured uplink grants neither configured with harq-ProcID-Offset2 nor with cg-RetransmissionTimer, the HARQ Process ID associated with the first symbol of a UL transmission is derived from the following equation:

HARQ Process ID=[floor(CURRENT_symbol/periodicity)]modulo nrofHARQ-Processes

For configured uplink grants with harq-ProcID-Offset2, the HARQ Process ID associated with the first symbol of a UL transmission is derived from the following equation:

HARQ Process ID=[floor(CURRENT_symbol/periodicity)]modulo nrofHARQ-Processes+harq-ProcID-Offset2 where CURRENT_symbol=(SFN×numberOfSlotsPerFrame×numberOfSymbolsPerSlot+slot number in the frame×numberOfSymbolsPerSlot+symbol number in the slot), and numberOfSlotsPer Frame and numberOfSymbolsPerSlot refer to the number of consecutive slots per frame and the number of consecutive symbols per slot, respectively as specified in 3GPP TS 38.211.

For configured uplink grants configured with cg-RetransmissionTimer, the wireless device implementation determines a HARQ Process ID among the HARQ process IDs available for the configured grant configuration. The wireless device may prioritize retransmissions before initial transmissions. The wireless device may toggle the new data indicator (NDI) in the CG-UCI for new transmissions and not toggle the NDI in the CG-UCI in retransmissions.

In Section 5.4.2.1 in 3GPP TS 38.321 V16.0.0: for configured uplink grants configured with cg-RetransmissionTimer, the redundancy version zero is used for initial transmissions and wireless device implementation dictates the redundancy version for retransmissions.

CG-UCI

CG-UCI is typically included in every CG-physical uplink shared channel (PUSCH) transmission and includes the information listed in Table 1.

TABLE 1

| CG-UCI Content |
| --- |
| UCI content |
| HARQ |
| RV |
| NDI |
| COT sharing information |
| CRC |

CG-UCI is mapped as described in 3GPP Release 15 (Rel-15) rules with CG-UCI having the highest priority. It is mapped on the symbols starting after first demodulation reference signal (DMRS) symbol. To determine the number of resource elements (REs) used for CG-UCI, the mechanism of beta-offset in 3GPP Rel-15 NR for HARQ-ACK on CG-PUSCH is reused. Nonetheless, a new RRC configured beta-offset for CG-UCI is defined.

If CG-PUSCH resources overlap with PUCCH carrying CSI-part1 and/or CSI-part 2, the later can be sent on CG-PUSCH. Radio resource control (RRC) configuration can be provided to the wireless device indicating whether to multiplex CG-UCI and HARQ-ACK. If configured, in the case of PUCCH overlapping with CG-PUSCH(s) within a PUCCH group, the CG-UCI and HARQ-ACK are jointly encoded as one UCI type. Otherwise, configured grant PUSCH is skipped if CG-PUSCH overlaps with PUCCH that carries HARQ ACK feedback.

Downlink feedback information (DFI)—To reduce the signaling overhead corresponding to explicit feedback transmission, NR-U supports a new DCI format, downlink feedback information ("CG-DFI"), that carry HARQ-ACK bitmap for all UL HARQ processes from the same wireless device. Additionally, the network node may trigger an adaptive retransmission using a dynamic grant.

Section 6.1, in 3GPP TS 38.214 V 16.1.0, describes that: if a wireless device receives an ACK for a given HARQ process in CG-DFI in a PDCCH ending in symbol i to terminate a transport block repetition in a PUSCH transmission on a given serving cell with the same HARQ process after symbol i, the wireless device is expected to terminate the repetition of the transport block in a PUSCH transmission starting from a symbol j if the gap between the end of PDCCH of symbol i and the start of the PUSCH transmission in symbol j is equal to or more than N2 symbols. The value N2 in symbols is determined according to the wireless device processing capability defined in, for example, 3GPP TS 38.214 V 16.1.0 Clause 6.4, and N2 and the symbol duration are based on the minimum of the subcarrier spacing corresponding to the PUSCH and the subcarrier spacing of the PDCCH indicating CG-DFI.

Further, in 3GPP TS 38.214 V 16.1.0, it is described that: for any RV sequence, the repetitions may be terminated after transmitting K repetitions, or at the last transmission occasion among the K repetitions within the period P, or from the starting symbol of the repetition that overlaps with a PUSCH with the same HARQ process scheduled by DCI format 0_0, 0_1 or 0_2, whichever is reached first. In addition, the wireless device may terminate the repetition of a transport block in a PUSCH transmission if the wireless device receives a DCI format 0_1 with DFI flag provided and set to '1', and if in this DCI the wireless device detects ACK for the HARQ process corresponding to that transport block.

Many of the features introduced for configured grant in the unlicensed spectrum where in part motivated by the possibility of listen before talk (LBT) failure and the negative impact on the performance if 3GPP Rel-15 configured UL behavior is to be used in the unlicensed spectrum. For at least this reason, the autonomous retransmission was introduced for NR-U CG. Using this feature, the wireless device can attempt to (re) transmit a PUSCH on any CG resource to cope with LBT failures, or failed reception due to interference. However, enabling autonomous retransmission has introduced fundamental changes to the 3GPP Rel-15 behavior and the introduction of new components, i.e., support of new UCI type, and monitoring of a new DCI (CG-DFI). The changes were not limited to radio access network 1 (RAN1, also referred to as radio layer 1), but also RAN2, e.g., support of implicit NACK if no feedback is received.

SUMMARY

Some embodiments advantageously provide methods, systems, and apparatuses for a configurable configured grant (CG) such as a configurable CG-uplink control information (UCI) and/or configurable CG-downlink feedback information (DFI).

In one or more embodiments of the instant disclosure, there is provided some flexibility in configuration of configured grant such that the wireless device can be configured with different features based on collision/interference environments.

In particular, the teachings of the instant disclosure advantageously allow for the wireless device to be configured for CG in a simpler and more efficient way, i.e., adapted to different collision/interference environments. For example, in a controlled environment that has very low LBT failure rate, some features designed to combat or reduce LBT failure can be deactivated, thereby, for example, reducing complexity.

According to one aspect of the disclosure, a network node is provided. The network node includes processing circuitry configured to: determine adapted configured grant, CG, control information based at least on CG control information, and signal the adapted CG control information for configuring transmission on at least one CG resource.

According to one or more embodiments of this aspect, the adapted CG control information includes at least one field that has a configurable quantity of bits. According to one or more embodiments of this aspect, the at least one field includes a hybrid automatic repeat request-identifier, HARQ-ID, field, redundancy version, RV, field, new data indicator, NDI, field, channel occupancy time, COT, sharing information field and CRC field. According to one or more embodiments of this aspect, at least one of: the HARQ-ID field is configurable from 0 to a first predefined number of bits, the RV field is configurable from 0 to a second predefined number of bits, the NDI field is configurable from 0 to a third predefined number of bits, the COT sharing information field is configurable from 0 to a fourth predefined number of bits, and the CRC field is configurable from 0 to a fifth predefined number of bits.

According to one or more embodiments of this aspect, the adapted CG control information is associated with a configurable field that is associated with a downlink feedback information, DFI, flag where the configurable field being configurable to be present or absent in the adapted CG control information based on a configuration of the CG control information. According to one or more embodiments of this aspect, the configurable field being absent indicates the network node does not provide explicit hybrid automatic repeat request-acknowledgement, HARQ-ACK, feedback for the transmission on the at least one CG resource. According to one or more embodiments of this aspect, the adapted CG control information is determined to configure autonomous retransmission at a wireless device.

According to one or more embodiments of this aspect, the adapted CG control information is determined to omit a configuration of the CG control information where the CG control information corresponds to one of CG-uplink control information, UCI, and CG-downlink feedback information, DFI. According to one or more embodiments of this aspect, the adapted CG control information is determined to configure segmentation of the transmission on at least one CG resource. According to one or more embodiments of this aspect, the segmentation of the transmission on at least one CG corresponds to configuring transmission on at least one CG resource in one of: a first segment, a subset of a segment, and in a plurality of segments.

According to one or more embodiments of this aspect, the processing circuitry is further configured to: interpret an expired CG timer as a hybrid automatic repeat request-negative acknowledgement, HARQ-NACK, and schedule a dynamic allocation for another transmission on another CG resource based at least on the expired timer. According to one or more embodiments of this aspect, the adapted CG control information corresponds to one of adapted CG-uplink control information, UCI, and adapted CG-downlink feedback information, DFI.

According to another aspect of the disclosure, a wireless device is provided. The wireless device includes processing circuitry configured to receive signaling of adapted configured grant, CG, control information that is based at least on CG control information where the adapted CG control information configures transmission on at least one CG resource, and determine whether to cause transmission on the at least on CG resource based at least in part on the adapted CG control information.

According to one or more embodiments of this aspect, the adapted CG control information includes at least one field that has a configurable quantity of bits. According to one or more embodiments of this aspect, the at least one field includes a hybrid automatic repeat request-identifier, HARQ-ID, field, redundancy version, RV, field, new data indicator, NDI, field, channel occupancy time, COT, sharing information field and CRC field. According to one or more embodiments of this aspect, at least one of: the HARQ-ID field is configurable from 0 to a first predefined number of bits, the RV field is configurable from 0 to a second predefined number of bits, the NDI field is configurable from 0 to a third predefined number of bits, the COT sharing information field is configurable from 0 to a fourth predefined number of bits, and the CRC field is configurable from 0 to a fifth predefined number of bits.

According to one or more embodiments of this aspect, the adapted CG control information is associated with a configurable field that is associated with a downlink feedback information, DFI, flag where the configurable field is configurable to be present or absent in the adapted CG control information based on a configuration of the CG control information. According to one or more embodiments of this aspect, the configurable field being absent indicates a network node does not provide explicit hybrid automatic repeat request-acknowledgement, HARQ-ACK, feedback for the transmission on the at least one CG resource. According to one or more embodiments of this aspect, the adapted CG control information configures autonomous retransmission at the wireless device.

According to one or more embodiments of this aspect, the processing circuitry is further configured to omit a configuration of the CG control information based at least on the adapted CG control information, the CG control information corresponding to one of CG-uplink control information, UCI, and CG-downlink feedback information, DFI. According to one or more embodiments of this aspect, the processing circuitry is further configured to segment the transmission on at least one CG resource based at least on the adapted CG control information. According to one or more embodiments of this aspect, the segmentation of the transmission on at least one CG corresponds to causing transmission on the at least one CG resource in one of: a first segment, a subset of a segment, and in a plurality of segments.

According to one or more embodiments of this aspect, the processing circuitry is further configured to receive a dynamic allocation for scheduling another transmission on another CG resource where the dynamic allocation is based at least on an expired timer that is interpreted as a hybrid automatic repeat request-negative acknowledgement, HARQ-NACK. According to one or more embodiments of this aspect, the adapted CG control information corresponds to one of adapted CG-uplink control information, UCI, and adapted CG-downlink feedback information, DFI.

According to another aspect of the disclosure, a method implemented in a network node is provided. Adapted configured grant, CG, control information is determined based at least on CG control information. The adapted CG control information for configuring transmission on at least one CG resource is signaled. According to one or more embodiments of this aspect, the adapted CG control information includes at least one field that has a configurable quantity of bits.

According to one or more embodiments of this aspect, the at least one field includes a hybrid automatic repeat request-identifier, HARQ-ID, field, redundancy version, RV, field, new data indicator, NDI, field, channel occupancy time, COT, sharing information field and CRC field. According to one or more embodiments of this aspect, at least one of: the HARQ-ID field is configurable from 0 to a first predefined number of bits, the RV field is configurable from 0 to a second predefined number of bits, the NDI field is configurable from 0 to a third predefined number of bits, the COT sharing information field is configurable from 0 to a fourth predefined number of bits, and the CRC field is configurable from 0 to a fifth predefined number of bits. According to one or more embodiments of this aspect, the adapted CG control information is associated with a configurable field that is associated with a downlink feedback information, DFI, flag where the configurable field is configurable to be present or absent in the adapted CG control information based on a configuration of the CG control information.

According to one or more embodiments of this aspect, the configurable field being absent indicates the network node does not provide explicit hybrid automatic repeat request-acknowledgement, HARQ-ACK, feedback for the transmission on the at least one CG resource. According to one or more embodiments of this aspect, the adapted CG control information is determined to configure autonomous retransmission at a wireless device. According to one or more embodiments of this aspect, the adapted CG control information is determined to omit a configuration of the CG control information where the CG control information corresponds to one of CG-uplink control information, UCI, and CG-downlink feedback information, DFI. According to one or more embodiments of this aspect, the adapted CG control information is determined to configure segmentation of the transmission on at least one CG resource.

According to one or more embodiments of this aspect, the segmentation of the transmission on at least one CG corresponds to configuring transmission on at least one CG resource in one of: a first segment, a subset of a segment, and in a plurality of segments. According to one or more embodiments of this aspect, an expired CG timer is interpreted as a hybrid automatic repeat request-negative acknowledgement, HARQ-NACK. A dynamic allocation is scheduled for another transmission on another CG resource based at least on the expired timer. According to one or more embodiments of this aspect, the adapted CG control information corresponds to one of adapted CG-uplink control information, UCI, and adapted CG-downlink feedback information, DFI.

According to another aspect of the disclosure, a method implemented by a wireless device is provided. Signaling of an adapted configured grant, CG, control information that is based at least on CG control information is received where the adapted CG control information configuring transmission on at least one CG resource. A determination is made whether to cause transmission on the at least on CG resource based at least in part on the adapted CG control information. According to one or more embodiments of this aspect, the adapted CG control information includes at least one field that has a configurable quantity of bits. According to one or more embodiments of this aspect, the at least one field includes a hybrid automatic repeat request-identifier, HARQ-ID, field, redundancy version, RV, field, new data indicator, NDI, field, channel occupancy time, COT, sharing information field and CRC field.

According to one or more embodiments of this aspect, at least one of: the HARQ-ID field is configurable from 0 to a first predefined number of bits, the RV field is configurable from 0 to a second predefined number of bits, the NDI field is configurable from 0 to a third predefined number of bits, the COT sharing information field is configurable from 0 to a fourth predefined number of bits, and the CRC field is configurable from 0 to a fifth predefined number of bits. According to one or more embodiments of this aspect, the adapted CG control information is associated with a configurable field that is associated with a downlink feedback information, DFI, flag where the configurable field is configurable to be present or absent in the adapted CG control information based on a configuration of the CG control information. According to one or more embodiments of this aspect, the configurable field being absent indicates a network node does not provide explicit hybrid automatic repeat request-acknowledgement, HARQ-ACK, feedback for the transmission on the at least one CG resource.

According to one or more embodiments of this aspect, the adapted CG control information configures autonomous retransmission at the wireless device. According to one or more embodiments of this aspect, a configuration of the CG control information is omitted based at least on the adapted CG control information where the CG control information corresponds to one of CG-uplink control information, UCI, and CG-downlink feedback information, DFI. According to one or more embodiments of this aspect, the transmission on at least one CG resource is segmented based at least on the adapted CG control information.

According to one or more embodiments of this aspect, the segmentation of the transmission on at least one CG corresponds to causing transmission on the at least one CG resource in one of: a first segment, a subset of a segment, and in a plurality of segments. According to one or more embodiments of this aspect, receiving a dynamic allocation for scheduling another transmission on another CG resource is received where the dynamic allocation is based at least on an expired timer that is interpreted as a hybrid automatic repeat request-negative acknowledgement, HARQ-NACK. According to one or more embodiments of this aspect, the adapted CG control information corresponds to one of adapted CG-uplink control information, UCI, and adapted CG-downlink feedback information, DFI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating example methods implemented in a communication system including a host computer, a network node and a wireless device for executing a client application at a wireless device according to some embodiments of the present disclosure;

FIG. 5 is a flowchart illustrating example methods implemented in a communication system including a host computer, a network node and a wireless device for receiving user data at a wireless device according to some embodiments of the present disclosure;

DETAILED DESCRIPTION

Figure 1:
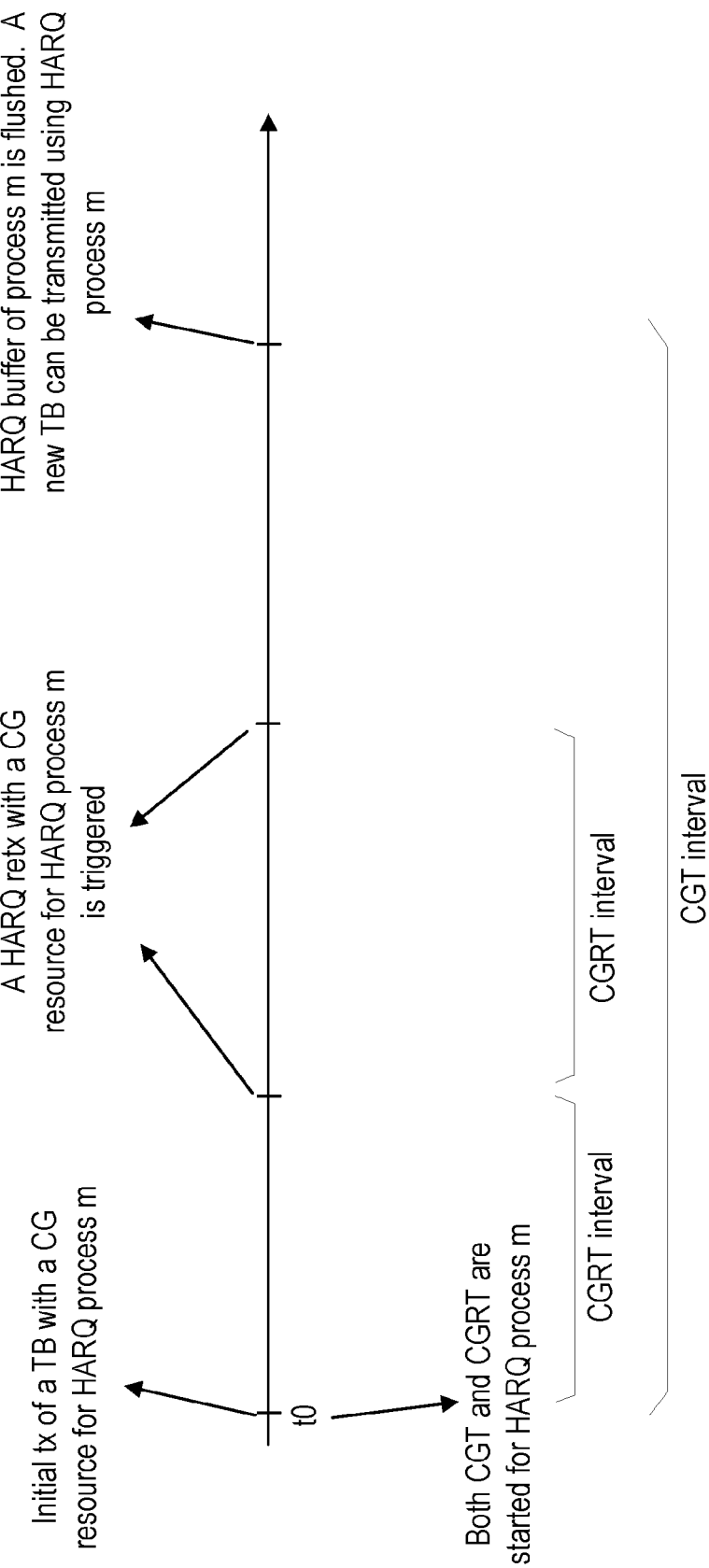
FIG. 1 is a diagram of CGT and CGRT intervals.

Before describing in detail example embodiments, it is noted that the embodiments reside primarily in combinations of apparatus components and processing steps related to a configurable configured grant (CG) such as a configurable CG-uplink control information (UCI) and/or configurable CG-downlink feedback information (DFI). As used herein, in one or more embodiments, CG may be used interchangeably with CG-UCI or CG-DFI. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes. Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB. Multi-cell/multicast Coordination Entity (MCE), IAB node, relay node, access point, radio access point. Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
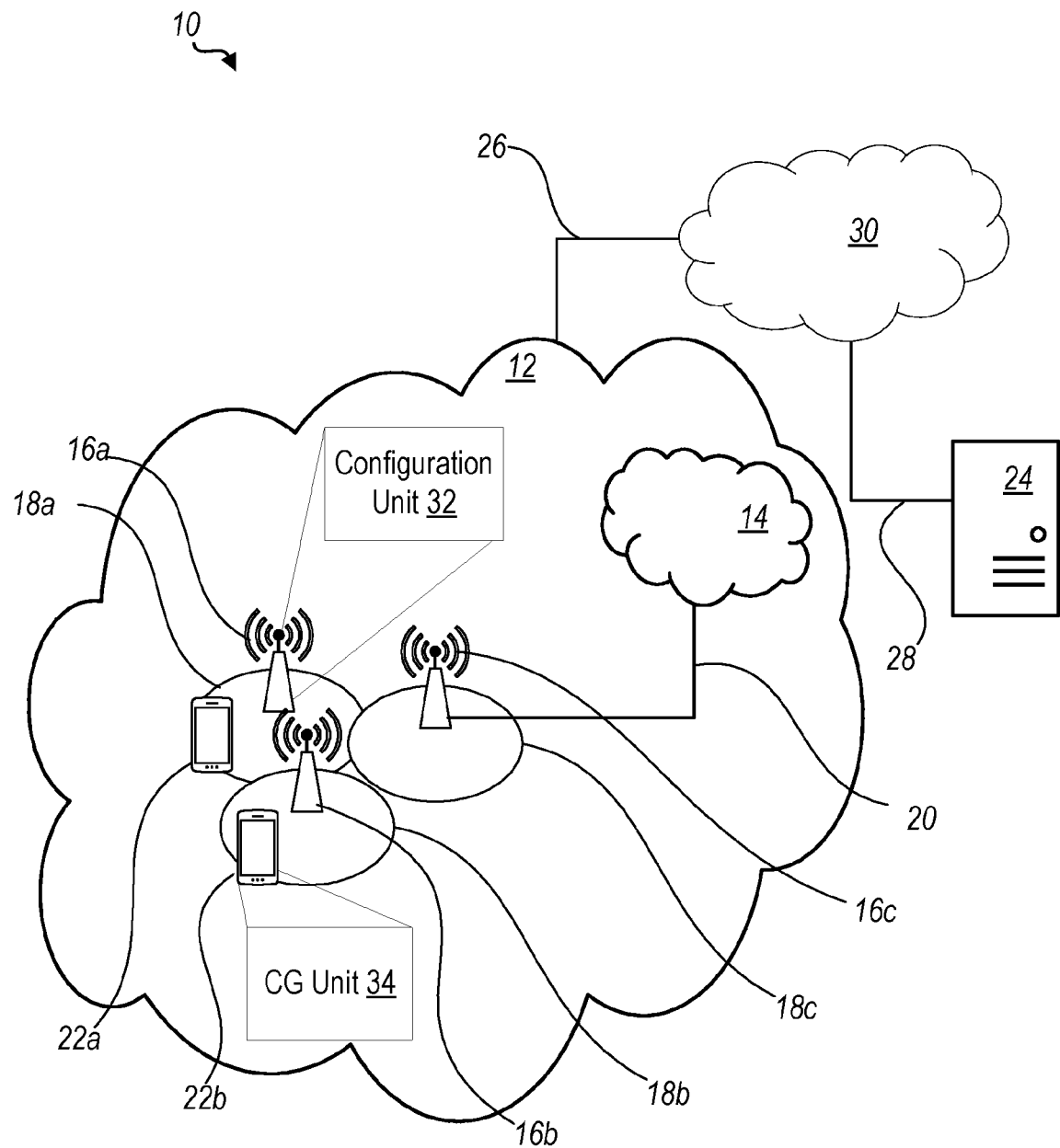
FIG. 2 is a schematic diagram of an example network architecture illustrating a communication system connected via an intermediate network to a host computer according to the principles in the present disclosure.

Some embodiments provide a configurable CG such as a configurable CG-UCI and/or configurable CG-DFI. Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to perform one or more network node 16 function as described herein such as with respect to a configurable CG such as a configurable CG-UCI and/or configurable CG-DFI. A wireless device 22 is configured to include a CG unit 34 which is configured to perform one or more wireless device 22 functions as described herein such as with respect to a configurable CG such as a configurable CG-UCI and/or configurable CG-DFI.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control. e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, determine, store, transmit, receive, relay, forward, monitor, indicator, etc., information related to a configurable CG such as a configurable CG-UCI and/or configurable CG-DFI.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control. e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform one or more network node 16 function described herein such as with respect to adapted CG control information that is based on CG information, and/or a configurable CG such as a configurable CG-UCI and/or configurable CG-DFI. For example, adapted CG control information may include aspect of 3GPP CG control information and also includes new aspects described herein such as configurable fields, autonomous re-transmission configuration with or without CG-UCI or CG-DFI (where existing system configure autonomous re-transmission only via a retransmission timer), etc. In one or more embodiments, the one or more new aspects of adapted CG control information may replace one or more aspects of existing 3GPP CG control information.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a CG unit 34 configured to perform one or more wireless device 22 function as described herein such as with respect to a configurable CG such as adapted CG control information that is based on CG information, and/or a configurable CG-UCI and/or configurable CG-DFI.

Figure 3:
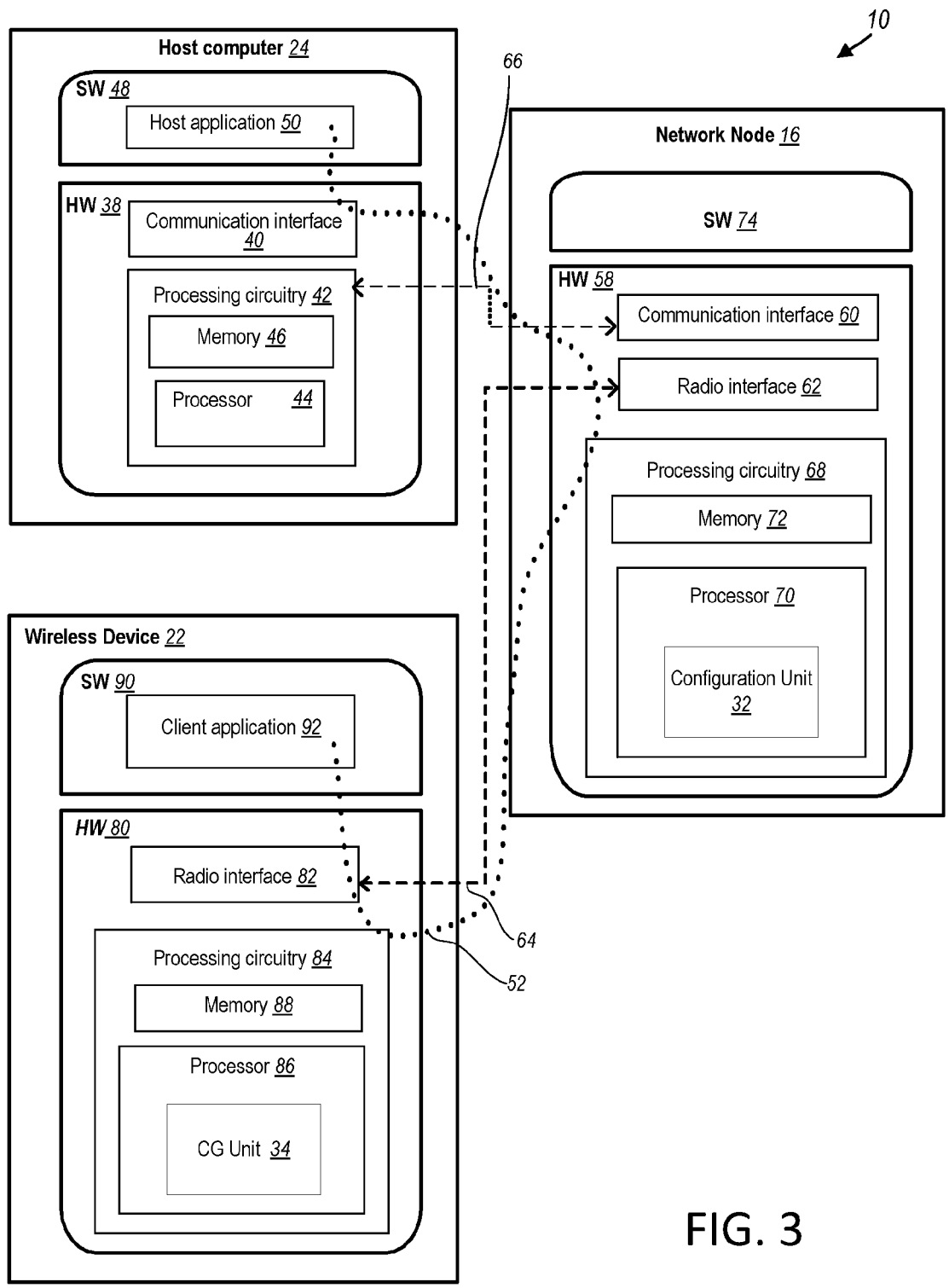
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as configuration unit 32, and CG unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 6, 7:
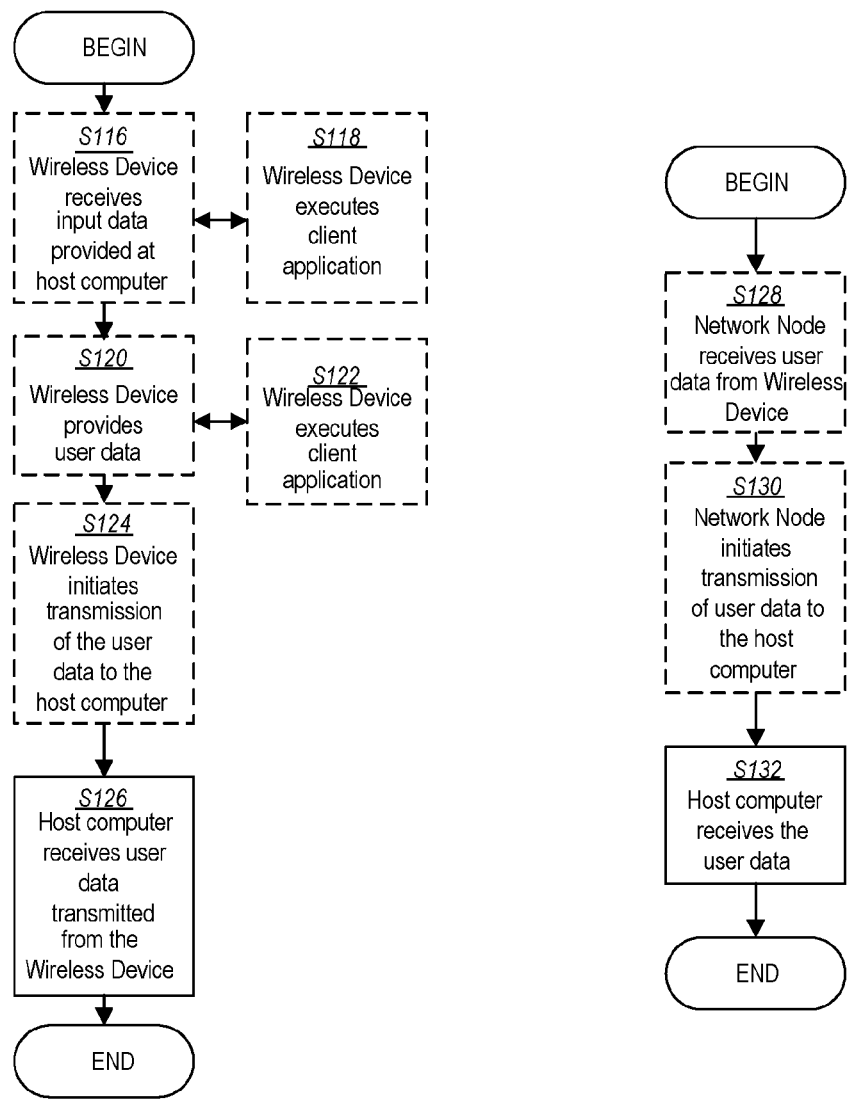
FIG. 6 is a flowchart illustrating example methods implemented in a communication system including a host computer, a network node and a wireless device for receiving user data from the wireless device at a host computer according to some embodiments of the present disclosure.
FIG. 7 is a flowchart illustrating example methods implemented in a communication system including a host computer, a network node and a wireless device for receiving user data at a host computer according to some embodiments of the present disclosure.

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
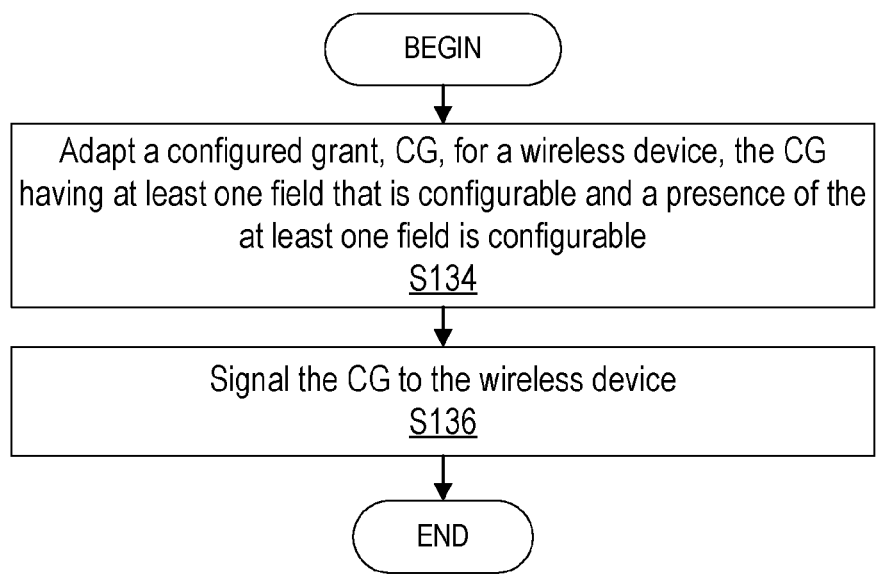
FIG. 8 is a flowchart of an example process in a network node according to some embodiments of the present disclosure.

FIG. 8 is a flowchart of an example process in a network node 16 according to some embodiments of the present disclosure. One or more Blocks and/or functions performed by network node 16 may be performed by one or more elements of network node 16 such as by configuration unit 32 in processing circuitry 68, processor 70, radio interface 62, etc. In one or more embodiments, network node 16 is configured to adapt (Block S134) a configured grant, CG, for a wireless device 22 where the CG (e.g., CG-UCI) has at least one field that is configurable, and a presence of the at least one field is configurable, as described herein. In one or more embodiments, network node 16 is configured to signal (Block S136) the CG to the wireless device 22, as described herein.

According to one or more embodiments, the CG is adapted based at least in part on one of collision and interference associated with an environment of the wireless device. According to one or more embodiments, the CG is a CG-uplink control information, CG-UCI, where the at least one field corresponds to at least one of: hybrid automatic repeat request (HARQ)-identifier (ID), redundancy version (RV), new data indicator (NDI), channel occupancy time (COT) sharing information and cyclic redundancy check (CRC). According to one or more embodiments, the CG is a CG-downlink feedback information, DFI, the at least one field corresponding to a DFI flag.

Figure 9:
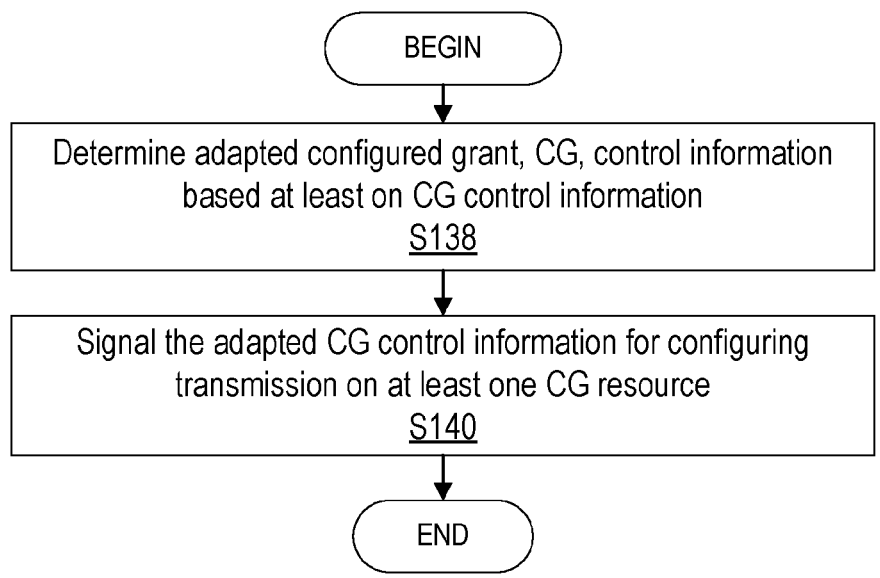
FIG. 9 is a flowchart of another example process in a network node according to some embodiments of the present disclosure.

FIG. 9 is a flowchart of another example process in a network node 16 according to some embodiments of the present disclosure. One or more Blocks and/or functions performed by network node 16 may be performed by one or more elements of network node 16 such as by configuration unit 32 in processing circuitry 68, processor 70, radio interface 62, etc. In one or more embodiments, network node 16 is configured to determine (Block S138) adapted configured grant, CG, control information based at least on CG control information, as described herein. The network node 16 is further configured to signal (Block S140) the adapted CG control information for configuring transmission on at least one CG resource, as described herein.

According to one or more embodiments, the adapted CG control information includes at least one field that has a configurable quantity of bits. According to one or more embodiments, the at least one field includes a hybrid automatic repeat request-identifier, HARQ-ID, field, redundancy version, RV, field, new data indicator, NDI, field, channel occupancy time, COT, sharing information field and CRC field. According to one or more embodiments, at least one of: the HARQ-ID field is configurable from 0 to a first predefined number of bits, the RV field is configurable from 0 to a second predefined number of bits, the NDI field is configurable from 0 to a third predefined number of bits, the COT sharing information field is configurable from 0 to a fourth predefined number of bits, and the CRC field is configurable from 0 to a fifth predefined number of bits.

According to one or more embodiments, the adapted CG control information is associated with a configurable field that is associated with a downlink feedback information, DFI, flag, the configurable field being configurable to be present or absent in the adapted CG control information based on a configuration of the CG control information. According to one or more embodiments, the configurable field being absent indicates the network node 16 does not provide explicit hybrid automatic repeat request-acknowledgement, HARQ-ACK, feedback for the transmission on the at least one CG resource. According to one or more embodiments, the adapted CG control information is determined to configure autonomous retransmission at a wireless device 22.

According to one or more embodiments, the adapted CG control information is determined to omit a configuration of the CG control information, the CG control information corresponding to one of CG-uplink control information, UCI, and CG-downlink feedback information, DFI. According to one or more embodiments, the adapted CG control information is determined to configure segmentation of the transmission on at least one CG resource. According to one or more embodiments, the segmentation of the transmission on at least one CG corresponds to configuring transmission on at least one CG resource in one of: a first segment, a subset of a segment, and in a plurality of segments.

According to one or more embodiments, the processing circuitry 68 is further configured to: interpret an expired CG timer as a hybrid automatic repeat request-negative acknowledgement, HARQ-NACK, and schedule a dynamic allocation for another transmission on another CG resource based at least on the expired timer. According to one or more embodiments, the adapted CG control information corresponds to one of adapted CG-uplink control information, UCI, and adapted CG-downlink feedback information, DFI.

Figure 10:
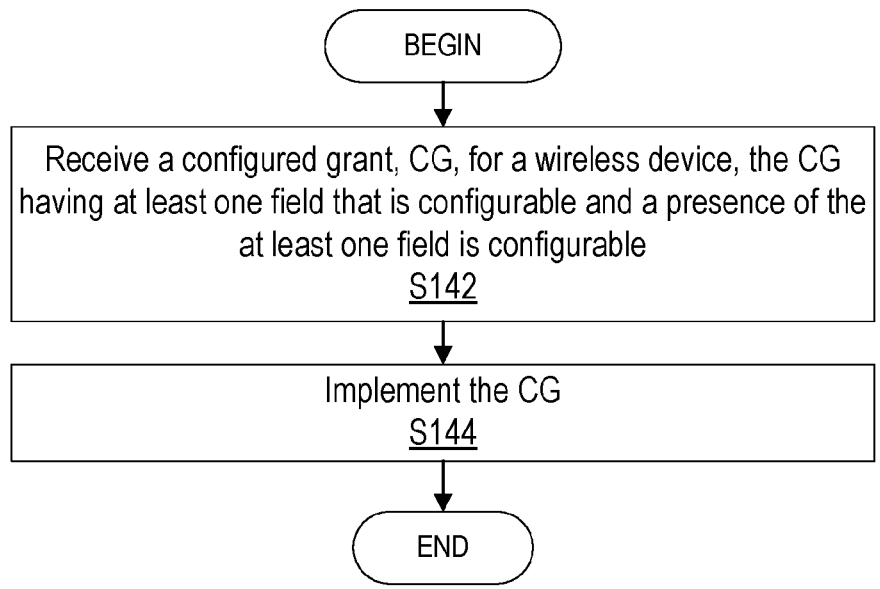
FIG. 10 is a flowchart of an example process in a wireless device according to some embodiments of the present disclosure.

FIG. 10 is a flowchart of an example process in a wireless device 22 according to some embodiments of the present disclosure. One or more Blocks and/or functions performed by wireless device 22 may be performed by one or more elements of wireless device 22 such as by CG unit 34 in processing circuitry 84, processor 86, radio interface 82, etc. In one or more embodiments, wireless device is configured to receive (Block S142) a configured grant, CG, for a wireless device 22 where the CG has at least one field that is configurable and a presence of the at least one field is configurable, as described herein. In one or more embodiments, wireless device 22 is configured to implement (Block S144) the CG, as described herein.

According to one or more embodiments, the CG is adapted based at least in part on one of collision and interference associated with an environment of the wireless device 22. According to one or more embodiments, the CG is a CG-uplink control information, CG-UCI, where the at least one field corresponds to at least one of: hybrid automatic repeat request (HARQ)-identifier (ID), redundancy version (RV), new data indicator (NDI), channel occupancy time (COT) sharing information and cyclic redundancy check (CRC). According to one or more embodiments, the CG is a CG-downlink feedback information, DFI, the at least one field corresponding to a DFI flag.

Figure 11:
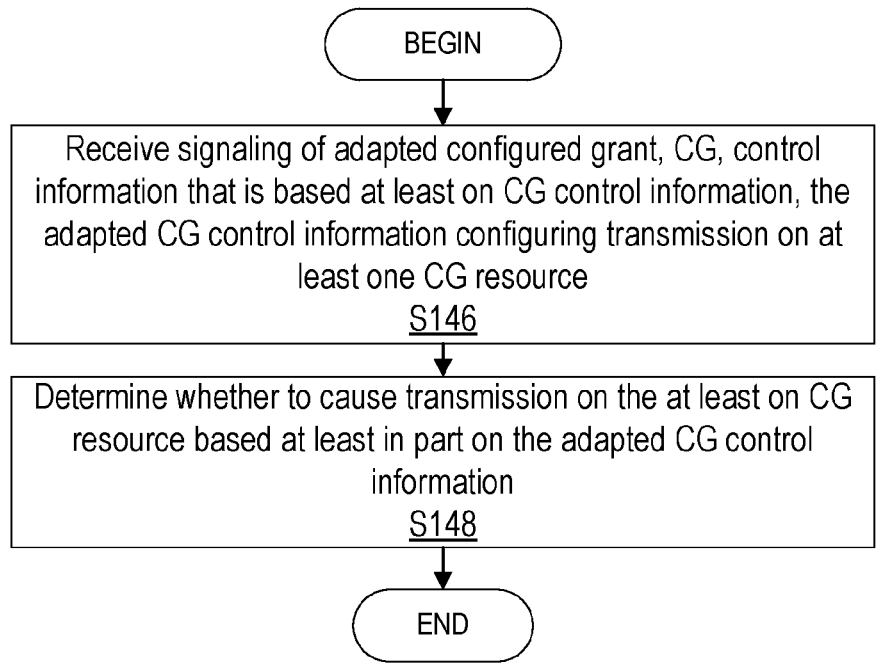
FIG. 11 is a flowchart of another example process in a wireless device according to some embodiments of the present disclosure.

FIG. 11 is a flowchart of an example process in a wireless device 22 according to some embodiments of the present disclosure. One or more Blocks and/or functions performed by wireless device 22 may be performed by one or more elements of wireless device 22 such as by CG unit 34 in processing circuitry 84, processor 86, radio interface 82, etc. In one or more embodiments, wireless device 22 is configured to receive (Block S146) signaling of adapted configured grant, CG, control information that is based at least on CG control information where the adapted CG control information configures transmission on at least one CG resource, as described herein. The wireless device 22 is configured to determine (Block S148) whether to cause transmission on the at least on CG resource based at least in part on the adapted CG control information, as described herein.

According to one or more embodiments, the adapted CG control information includes at least one field that has a configurable quantity of bits. According to one or more embodiments, the at least one field includes a hybrid automatic repeat request-identifier, HARQ-ID, field, redundancy version, RV, field, new data indicator, NDI, field, channel occupancy time, COT, sharing information field and CRC field. According to one or more embodiments, at least one of: the HARQ-ID field is configurable from 0 to a first predefined number of bits, the RV field is configurable from 0 to a second predefined number of bits, the NDI field is configurable from 0 to a third predefined number of bits, the COT sharing information field is configurable from 0 to a fourth predefined number of bits, and the CRC field is configurable from 0 to a fifth predefined number of bits.

According to one or more embodiments, the adapted CG control information is associated with a configurable field that is associated with a downlink feedback information, DFI, flag, where the configurable field is configurable to be present or absent in the adapted CG control information based on a configuration of the CG control information. According to one or more embodiments, the configurable field being absent indicates a network node 16 does not provide explicit hybrid automatic repeat request-acknowledgement, HARQ-ACK, feedback for the transmission on the at least one CG resource. According to one or more embodiments, the adapted CG control information configures autonomous retransmission at the wireless device 22.

According to one or more embodiments, the processing circuitry 84 is further configured to omit a configuration of the CG control information based at least on the adapted CG control information where the CG control information corresponds to one of CG-uplink control information, UCI, and CG-downlink feedback information, DFI. According to one or more embodiments, the processing circuitry 84 is further configured to segment the transmission on at least one CG resource based at least on the adapted CG control information. According to one or more embodiments, the segmentation of the transmission on at least one CG corresponds to causing transmission on the at least one CG resource in one of: a first segment, a subset of a segment, and in a plurality of segments.

According to one or more embodiments, the processing circuitry 84 is further configured to receive a dynamic allocation for scheduling another transmission on another CG resource where the dynamic allocation is based at least on an expired timer that is interpreted as a hybrid automatic repeat request-negative acknowledgement, HARQ-NACK. According to one or more embodiments, the adapted CG control information corresponds to one of adapted CG-uplink control information, UCI, and adapted CG-downlink feedback information, DFI.

Having generally described arrangements for a configurable CG such as a configurable CG-UCI and/or configurable CG-DFI, details for these arrangements, functions and processes are provided as follows, and which may be implemented by the network node 16, wireless device 22 and/or host computer 24. Some embodiments provide a configurable CG such as a configurable CG-UCI and/or configurable CG-DFI. One or more network node 16 functions described below may be performed by one or more of configuration unit 32 in processing circuitry 68, processor 70, radio interface 62, etc. One or more wireless device 22 functions described below may be performed by one or more of CG unit 34 in processing circuitry 84, processor 86, radio interface 82, etc.

Configurable CG-UCI

In one embodiment, the one or more of the fields in CG-UCI is configurable such as by network node 16. As one aspect of this embodiment, the presence or absence of the field is configurable. As another aspect, the number of bits for the field is configurable. That means the number of bits for each field or absence of HARQ, RV, NDI, COT sharing information, and CRC can be configured by higher layer parameters. As an example, the following Table 2 indicates the field and number of bits for each field (i.e., configurable quantity of bits).

TABLE 2

| CG-UCI field | number of bits |
| --- | --- |
| HARQ-ID | configurable 0 up to 4 bits |
| RV | configurable 0 up to 2 bits |
| NDI | configurable 0 up to 1 bits |
| COT sharing information | configurable 0 up to X bits |
| CRC | configurable 0 up to Y bits |

If configured HARQ-ID field is 0 bit, it indicates that only one HARQ-ID is used for the UL-CG PUSCH transmission. The used HARQ-ID can be predefined or derived from an equation (e.g., derived as a function of the configuration index of the UL CG). In some embodiments, the specific equation may be from 3GPP wireless communication standards.

If configured RV field is 0 bit, it indicates that only one RV value (or one RV sequence) is used for aggregated transmission of the UL CG PUSCH. The RV value (or RV sequence) is preferably predefined. One example of the predefined RV value is RV 0 (correspondingly, the predefined RV sequence is (0,0,0,0)).

If NDI field is 0 bit, the wireless device 22 is not expected to perform retransmissions on CG resources, or only on initial transmissions on a CG-resource as another variant, if new data indicator (NDI) in not included, RV is also not included in the UCI.

If COT sharing information field is 0 bit that indicates to the wireless device 22 that the network node 16 does not expect the wireless device 22 to share its COT with the network node 16. For example, one case where the COT is not expected to be shared is for FBE (i.e., semi-static channel occupancy). FBE may correspond to frame based equipment.

If all fields in Table 2 are disabled, then CG-UCI is not present and there is no CRC.

As another aspect, a field can be disabled implicitly. For instance, if network node 16 indicated that autonomous retransmissions are not expected from the wireless device 22, using higher layer signalling, or L1 signalling, the wireless device 22 is not expected to include at least one of the fields (e.g., HARQ-ID, RV, and NDI). As a non-limiting example, disabling autonomous retransmissions can be performed by disabling cg-retransmissionTimer, or disabling monitoring of DFI. A disabled and/or absent field may correspond to: a field of size: 0 bits, to a field that has been remove, to a field whose flag and indication is set to indicate for the wireless device to ignore the field.

Alternatively, for each CG-UCI field of configurable size, a RRC parameter is defined to signal the field size from the network node. Some examples of RRC parameters to configure the CG-UCI field sizes are shown in Table 3, and the RRC parameters are illustrated below, in bold, as components of the ConfiguredGrantConfig information element.

TABLE 3

Example RRC parameters to configure the CG-UCI field sizes

| CG-UCI field | RRC parameter to configure the field size |
| --- | --- |
| HARQ-ID | cg-nrofBits-HARQ |
| RV | cg-nrofBits-RV |
| COT sharing information | cg-nrofBits-COT |

```
    ConfiguredGrantConfig information element
ConfiguredGrantConfig ::=                        SEQUENCE {
    frequency Hopping                            ENUMERATED {intraSlot, interSlot}
OPTIONAL, -- Need S
    cg-DMRS-Configuration                        DMRS-UplinkConfig,
    mcs-Table                                    ENUMERATED {qam256, qam64LowSE}
OPTIONAL, -- Need S
    mcs-TableTransformPrecoder                   ENUMERATED {qam256, qam64LowSE}
OPTIONAL, -- Need S
    uci-OnPUSCH                                  SetupRelease { CG-UCI-OnPUSCH }
OPTIONAL, -- Need M
    resourceAllocation                           ENUMERATED { resourceAllocationType0,
resourceAllocationType1, dynamicSwitch },
    rbg-Size                                     ENUMERATED {config2}
OPTIONAL, -- Need S
    powerControlLoopToUse                        ENUMERATED {n0, n1},
    p0-PUSCH-Alpha                               P0-PUSCH-AlphaSetId,
    transformPrecoder                            ENUMERATED {enabled, disabled}
OPTIONAL, -- Need S
    nrofHARQ-Processes                           INTEGER(1..16),
    repK                                         ENUMERATED {n1, n2, n4, n8},
    repK-RV                                      ENUMERATED {s1-0231, s2-0303, s3-0000}
OPTIONAL, -- Need R
    periodicity                                  ENUMERATED {
                                                 sym2, sym7, sym1x14, sym2x14, sym4x14, sym5x14,
sym8x14, sym10x14, sym16x14, sym20x14,
                                                 sym32x14, sym40x14, sym64x14, sym80x14,
sym128x14, sym160x14, sym256x14, sym320x14, sym512x14,
                                                 sym640x14, sym1024x14, sym1280x14, sym2560x14,
sym5120x14,
                                                 sym6, sym1x12, sym2x12, sym4x12, sym5x12,
sym8x12, sym10x12, sym16x12, sym20x12, sym32x12,
                                                 sym40x12, sym64x12, sym80x12, sym128x12,
sym160x12, sym256x12, sym320x12, sym512x12, sym640x12,
                                                 sym1280x12, sym2560x12
    },
    configuredGrantTimer                         INTEGER (1..64)
OPTIONAL, -- Need R
    rrc-ConfiguredUplinkGrant                    SEQUENCE {
        timeDomainOffset                         INTEGER (0..5119),
        timeDomain Allocation                    INTEGER (0..15),
        frequency Domain Allocation              BIT STRING (SIZE(18)),
        antennaPort                              INTEGER (0..31),
        dmrs-SeqInitialization                   INTEGER (0..1)
OPTIONAL, -- Need R
        precodingAndNumberOfLayers               INTEGER (0..63),
        srs-ResourceIndicator                    INTEGER (0..15)
OPTIONAL, -- Need R
        mcs AndTBS                               INTEGER (0..31),
        frequency HoppingOffset                  INTEGER (1 ..
maxNrofPhysicalResourceBlocks-1)                 OPTIONAL, -- Need R
        pathlossReferenceIndex                   INTEGER (0..maxNrofPUSCH-
PathlossReferenceRSs-1),
    ...,
    [[
        pusch-RepTypeIndicator-r16               ENUMERATED {pusch-RepTypeA,pusch-
RepTypeB}                OPTIONAL, -- Need M
        frequency HoppingPUSCH-RepTypeB-r16 ENUMERATED {interRepetition,
interSlot}                OPTIONAL, -- Cond RepTypeB
```

```
    timeReferenceSFN-r16            ENUMERATED {sfn512}
OPTIONAL -- Need R
   ]]
 }                                                    OPTIONAL, -
- Need R
   ...,
   [[
   cg-RetransmissionTimer-r16           INTEGER (1..64)
OPTIONAL, -- Need R
   cg-minDFI-Delay-r16                  INTEGER (1..ffsValue)
OPTIONAL, -- Need R Upper limit 7 FFS
   cg-nrofPUSCH-InSlot-r16              INTEGER (1..ffs Value)
OPTIONAL, -- Need R
   cg-nrofSlots-r16              INTEGER (1..ffsValue)
OPTIONAL, -- Need R
   cg-StartingFullBW-InsideCOT-r16           ENUMERATED {ffs}
OPTIONAL, -- Need R
   cg-StartingFullBW-OutsideCOT-r16           ENUMERATED {ffs}
OPTIONAL, -- Need R
   cg-StartingPartialBW-InsideCOT-r16        ENUMERATED {ffs}
OPTIONAL, -- Need R
   cg-StartingPartialBW-OutsideCOT-r16        ENUMERATED {ffs}
OPTIONAL, -- Need R
   cg-UCI-Multiplexing         ENUMERATED {enabled}
OPTIONAL, -- Need R
   cg-COT-SharingOffset-r16             (1..ffsValue)
OPTIONAL, -- Need R
   cg-nrofBits-HARQ                     INTEGER (0..4)
OPTIONAL, -- Need R
   cg-nrofBits-RV                       INTEGER (0..2)
OPTIONAL, -- Need R
   cg-nrofBits-COT-Sharing              INTEGER (0..1)
OPTIONAL, -- Need R
   betaOffsetCG-UCI-r16                 INTEGER (1..ffsValue)
OPTIONAL, -- Need R
   cg-COT-SharingList-r16               SEQUENCE (SIZE (1..ffsValue)) OF CG-
COT-Sharing-r16 OPTIONAL, -- Need R
   harq-ProcID-Offset-r16           INTEGER (0..15)
OPTIONAL, -- Need M
   harq-ProcID-Offset2-r16          INTEGER (0..15)
OPTIONAL, -- Need M
   configuredGrantConfigIndex-r16           ConfiguredGrantConfigIndex-r16
OPTIONAL, -- Need M
   configuredGrantConfigIndexMAC-r16        ConfiguredGrantConfigIndexMAC-r16
OPTIONAL, -- Need M
   periodicity Ext-r16          INTEGER (1..5120)
OPTIONAL, -- Need M
   startingFromRV0-r16                  ENUMERATED {on, off}
OPTIONAL, -- Need M
   phy-Priority Index-r16           ENUMERATED {p0, p1}
OPTIONAL, -- Need M
   autonomousReTx-r16                   ENUMERATED {enabled}
OPTIONAL -- Cond LCH-BasedPrioritization
   ]]
}
CG-UCI-OnPUSCH ::= CHOICE {
   dynamic                  SEQUENCE (SIZE (1..4)) OF BetaOffsets,
   semi Static              BetaOffsets
}
CG-COT-Sharing-r16 ::= SEQUENCE {
   duration-r16             INTEGER (1..ffsValue),
   offset-r16               INTEGER (1..ffsValue),
   channel AccessPriority-r16           INTEGER (1..4)
}
```

TAG-CONFIGUREDGRANTCONFIG-STOP ASNISTOP

Configurable CG-DFI

In one embodiment, the presence or absence of the direct forwarding indication (DFI) flag in DCI 1_1 depends on the CG-configuration. DCI 1_1 may refer to a specific DCI format that is known in the art. For example, if autonomous retransmissions are expected, the field is present, otherwise the field may not be present in DCI 1_1.

Alternatively, the presence of the field in DCI 1_1 is configurable (e.g., via an RRC parameter). If the field is not present, the wireless device 22 does not expect explicit HARQ-ACK feedback from the network node 16.

As another aspect of this embodiment, if explicit HARQ-ACK feedback is disabled (i.e., no DFI flag or DFI flag is configured to be absent), the wireless device 22 does not perform a retransmission of the transmitted CG-PUSCH unless the wireless device 22 receives an UL grant rescheduling the same HARQ process.

As another aspect of this embodiment, if explicit HARQ-ACK feedback is disabled (i.e., no DFI flag or DFI flag is configured to be absent), the wireless device 22 assumes ACK after configured grant timer (CGT) expiry.

In another embodiment, CG-DFI, if configured, indicates NACK for all HARQ processes in a wireless device 22. Then expiring configured grant timer (CGT) represents ACK. The wireless device 22, if NACK is received in a HARQ process, retransmit the failed packets for that HARQ process on the next configured resources.

Autonomous Re-Transmission

In one embodiment, the autonomous transmission can be configured with or without using CG-UCI or CG-DFI. In one example, the use of autonomous transmission feature may use CG-UCI and CG-DFI. So, the following combination may exist:
1. Autonomous transmission with CG-UCI and CG-DFI
2. Autonomous transmission with CG-UCI but without CG-DFI
3. Autonomous transmission without CG-UCI, but with CG-DFI
4. Autonomous transmission without CG-UCI and CG-DFI
   When CG-UCI is not configured, the network node 16 and wireless device 22 derive the HARQ protocol identifier (PID) from an equation. As a non-limiting example, the equation may be the same equation used in 3GPP Rel-15 to derive the HARQ process assigned for a CG-resource, nonetheless with the exception of enabling retransmissions of an earlier PUSCH assigned with the same HARQ ID.
   When CG-DFI is not configured, then expiring CGT denotes HARQ-ACK and in case of HARQ-NACK, the network node 16 schedules a dynamic grant.

Reducing HARQ Segmentation

In one embodiment, when there is segmentation in uplink CG transmission, the wireless device 22 may only send CG-UCI. e.g., with one or more of the following options:
1. first segment,
2. subset of the segment, e.g., the segment with largest size of transmission resources,
3. in one of the segments amongst all the segments, and
4. all the segments.

In one embodiment, if the transmission encounters invalid symbols/slots, then instead of segmentation, the wireless device 22 drops the entire transmission. Invalid symbols/slots may refer to improperly decoded symbols/slots.

In one embodiment, if the transmission encounters invalid symbols/slots, then instead of segmentation, the wireless device 22 shifts the transmission (e.g., in time-domain) in such a manner that no segmentation is needed, and the transmission is performed in one transmission, i.e., without segmentation.

CG Modification

In one embodiment, in NR-U, the CG-UCI may not be mandatory, which means the wireless device 22 can utilize for HARQ-ID derivation based on some equation (e.g., as in NR), which the network node 16 can also derive based on the same equation (e.g., same equation used in 3GPP Rel-15). CG-UCI may be disabled for this case. Alternatively, the equation is used for both initial and retransmissions of a HARQ process. In this case, the wireless device 22 does not signal HARQ ID, but still signals at least one of NDI and RV.

In one embodiment, autonomous retransmission can also be enabled when operating in licensed spectrum where, for example, the UCI is carried in CG-PUSCH where this UCI carries at least one of HARQ ID, NDI, and RV fields.

In one embodiment, the HARQ-feedback for NR CG transmission can be allowed similar NR-U DFI usage.

Hence, if the CG timer expires in NR, then it is considered a NACK, and action can be taken accordingly, e.g., schedule dynamic allocation for the transmission; otherwise the network node 16 sends ACK for transmission success before the expiration of timer.

Physical Layer Priority of an Uplink Transmission

In this embodiment, an uplink transmission is provided with a physical layer priority. The physical layer priority is provided via a fixed, predefined value; or via DCI; or via RRC configuration. In one or more examples, two levels of physical layer priorities are provided (e.g., 0 for low physical layer priority, 1 for high physical layer), although more than two levels of priority levels can be defined if necessary. In terms of traffic type, higher physical layer priority is associated with traffic with more stringent performance requirement (e.g., shorter latency target, and/or higher reliability target), whereas low physical layer priority is associated with traffic with more relaxed performance requirement (e.g., longer latency target, and/or lower reliability target). In some embodiments, the uplink transmission may be composed of payload data only, or may be composed of UCI only, or may be composed of both UCI and payload data.

In one example, transmission of different physical layer priority is mapped to different channel access categories. For instance, uplink transmission associated with high physical layer priority is assigned to LBT Category 2 (i.e., LBT without random back-off), whereas uplink transmission associated with low physical layer priority is assigned to LBT Category 4 (i.e., LBT with random back-off).

In another example, transmission of different physical layer priority is mapped to different channel access priority classes. For instance, transmission associated with high physical layer priority is assigned with the highest channel access priority class p=1, always. In some embodiments, "high" may refer to a level greater than a first predefined threshold while "low" may refer to a level less than the first predefined threshold and/or a second predefined threshold. In contrast, transmission associated with low physical layer priority can be assigned to lower channel access priority class (e.g., p=2, 3, 4). In another example, which p value(s) are assigned to high (or low) physical layer priority is RRC configured.

Therefore, the teachings described herein provide at least some advantages over other solutions. One such advantage is that the wireless device 22 can be configured for CG in a less complex and more efficient manner, i.e., adapted to different collision/interference environments. For example, in a controlled environment that has very low LBT failure rate, some feature designed to combat LBT failure can be deactivated as these features may not be needed or required. Further, a semi-persistent scheduling (SPS) PDSCH can be released for DL-SPS configured by one-slot periodicity.

SOME EXAMPLES

Example A1. A network node 16 configured to communicate with a wireless device 22 (WD 22), the network node 16 configured to, and/or comprising a radio interface 62 and/or comprising processing circuitry 68 configured to:
adapt a configured grant, CG, for a wireless device 22, the CG having at least one field that is configurable and a presence of the at least one field is configurable; and
signal the CG to the wireless device 22.

Example A2. The network node 16 of Example A1, wherein the CG is adapted based at least in part on one of collision and interference associated with an environment of the wireless device 22.

Example A3. The network node 16 of Example A1, wherein the CG is a CG-uplink control information, CG-UCI, the at least one field corresponding to at least one of: hybrid automatic repeat request (HARQ)-identifier (ID), redundancy version (RV), new data indicator (NDI), channel occupancy time (COT) sharing information and cyclic redundancy check (CRC).

Example A4. The network node 16 of Example A1, wherein the CG is a CG-downlink feedback information, DFI, the at least one field corresponding to a DFI flag.

Example B1. A method implemented in a network node 16 that is configured to communicate with a wireless device 22, the method comprising:
adapting a configured grant, CG, for a wireless device 22, the CG having at least one field that is configurable and a presence of the at least one field is configurable; and
signaling the CG to the wireless device 22.

Example B2. The method of Example B1, wherein the CG is adapted based at least in part on one of collision and interference associated with an environment of the wireless device 22.

Example B3. The method of Example B1, wherein the CG is a CG-uplink control information, CG-UCI, the at least one field corresponding to at least one of: hybrid automatic repeat request (HARQ)-identifier (ID), redundancy version (RV), new data indicator (NDI), channel occupancy time (COT) sharing information and cyclic redundancy check (CRC).

Example B4. The method of Example B1, wherein the CG is a CG-downlink feedback information, DFI, the at least one field corresponding to a DFI flag.

Example C1. A wireless device 22 (WD 22) configured to communicate with a network node 16, the WD 22 configured to, and/or comprising a radio interface 82 and/or processing circuitry 84 configured to:
receive a configured grant, CG, for a wireless device 22, the CG having at least one field that is configurable and a presence of the at least one field is configurable; and
implement the CG.

Example C2. The WD 22 of Example C1, wherein the CG is adapted based at least in part on one of collision and interference associated with an environment of the wireless device 22.

Example C3. The WD 22 of Example C1, wherein the CG is a CG-uplink control information, CG-UCI, the at least one field corresponding to at least one of: hybrid automatic repeat request (HARQ)-identifier (ID), redundancy version (RV), new data indicator (NDI), channel occupancy time (COT) sharing information and cyclic redundancy check (CRC).

Example C4. The WD 22 of Example C1, wherein the CG is a CG-downlink feedback information, DFI, the at least one field corresponding to a DFI flag.

Example D1. A method implemented in a wireless device 22 (WD 22) that is configured to communicate with a network node 16, the method comprising:
receiving a configured grant, CG, for a wireless device 22, the CG having at least one field that is configurable and a presence of the at least one field is configurable; and
implementing the CG.

Example D2. The method of Example D1, wherein the CG is adapted based at least in part on one of collision and interference associated with an environment of the wireless device 22.

Example D3. The method of Example D1, wherein the CG is a CG-uplink control information, CG-UCI, the at least one field corresponding to at least one of: hybrid automatic repeat request (HARQ)-identifier (ID), redundancy version (RV), new data indicator (NDI), channel occupancy time (COT) sharing information and cyclic redundancy check (CRC).

Example D4. The method of Example D1, wherein the CG is a CG-downlink feedback information, DFI, the at least one field corresponding to a DFI flag.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, comprising:
   processing circuitry configured to:
   determine adapted configured grant, CG, control information based at least on CG control information; and
   signal the adapted CG control information for configuring transmission on at least one CG resource, the adapted CG control information corresponding to adapted CG-uplink control information, UCI, and including at least one field that has a configurable quantity of bits, the at least one field including one or more of: a hybrid automatic repeat request identifier, HARQ-ID, field, a redundancy version, RV, field, and a new data indicator, NDI, field.

2. A wireless device, comprising:
   processing circuitry configured to:
   receive signaling of adapted configured grant, CG, control information that is based at least on CG control information, the adapted CG control information configuring transmission on at least one CG resource, the adapted CG control information corresponding to adapted CG-uplink control information, UCI, and including at least one field that has a configurable quantity of bits, the at least one field including one or more of: a hybrid automatic repeat request identifier, HARQ-ID, field, a redundancy version, RV, field, and a new data indicator, NDI, field; and
   determine whether to cause transmission on the at least on CG resource based at least in part on the adapted CG control information.

3. A method implemented in a network node, the method comprising:
   determining adapted configured grant, CG, control information based at least on CG control information; and
   signaling the adapted CG control information for configuring transmission on at least one CG resource, the adapted CG control information corresponding to adapted CG-uplink control information, UCI, and including at least one field that has a configurable quantity of bits, the at least one field including one or more of: a hybrid automatic repeat request identifier, HARQ-ID, field, a redundancy version, RV, field, and a new data indicator, NDI, field.

4. The method of claim 3, wherein at least one of:
   the HARQ-ID field is configurable from 0 to a first predefined number of bits;
   the RV field is configurable from 0 to a second predefined number of bits; and
   the NDI field is configurable from 0 to a third predefined number of bits.

5. The method of claim 3, wherein the adapted CG control information is associated with a configurable field that is associated with a downlink feedback information, DFI, flag, the configurable field being configurable to be present or absent in the adapted CG control information based on a configuration of the CG control information.

6. The method of claim 5, wherein the configurable field being absent indicates the network node does not provide explicit hybrid automatic repeat request-acknowledgement, HARQ-ACK, feedback for the transmission on the at least one CG resource.

7. The method of claim 3, wherein the adapted CG control information is determined to configure autonomous retransmission at a wireless device.

8. The method of claim 7, wherein the adapted CG control information is determined to omit a configuration of the CG control information, the CG control information corresponding to one of CG-uplink control information, UCI, and CG-downlink feedback information, DFI.

9. The method of claim 3, wherein the adapted CG control information is determined to configure segmentation of the transmission on at least one CG resource.

10. The method of claim 9, wherein the segmentation of the transmission on at least one CG corresponds to configuring transmission on at least one CG resource in one of:
    a first segment;
    a subset of a segment; and
    in a plurality of segments.

11. The method of claim 3, further comprising:
    interpreting an expired CG timer as a hybrid automatic repeat request-negative acknowledgement, HARQ-NACK; and
    scheduling a dynamic allocation for another transmission on another CG resource based at least on the expired timer.

12. The method of claim 3, wherein the adapted CG control information corresponds to one of adapted CG-uplink control information, UCI, and adapted CG-downlink feedback information, DFI.

13. A method implemented by a wireless device, the method comprising:
  receiving signaling of adapted configured grant, CG, control information that is based at least on CG control information, the adapted CG control information configuring transmission on at least one CG resource, the adapted CG control information corresponding to adapted CG-uplink control information, UCI, and including at least one field that has a configurable quantity of bits, the at least one field including one or more of: a hybrid automatic repeat request identifier, HARQ-ID, field, a redundancy version, RV, field, and a new data indicator, NDI, field; and
  determining whether to cause transmission on the at least on CG resource based at least in part on the adapted CG control information.

14. The method of claim 13, wherein the adapted CG control information is associated with a configurable field that is associated with a downlink feedback information, DFI, flag, the configurable field being configurable to be present or absent in the adapted CG control information based on a configuration of the CG control information.

15. The method of claim 13, wherein the adapted CG control information configures autonomous retransmission at the wireless device.

16. The method of claim 13, further comprising segmenting the transmission on at least one CG resource based at least on the adapted CG control information.

17. The method of claim 13, further comprising receiving a dynamic allocation for scheduling another transmission on another CG resource, the dynamic allocation being based at least on an expired timer that is interpreted as a hybrid automatic repeat request-negative acknowledgement, HARQ-NACK.

* * * * *